(No Model.)
G. H. STAHL.
WATER HEATER.
No. 469,101. Patented Feb. 16, 1892.
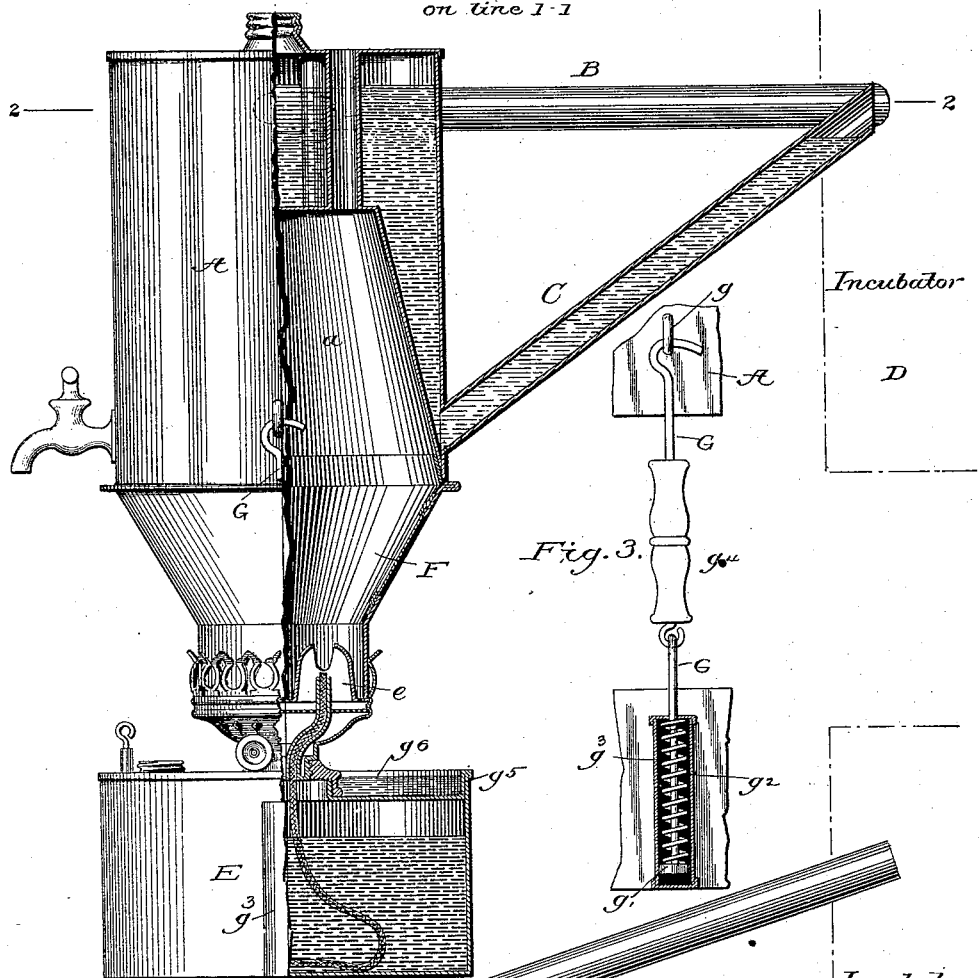
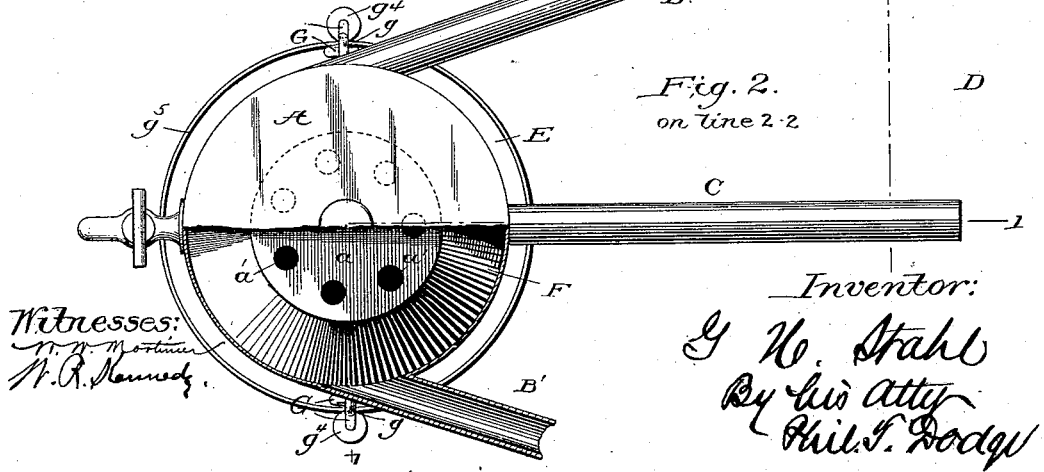
Witnesses:
Inventor:
G. H. Stahl
By his Atty
Phil. T. Dodge

UNITED STATES PATENT OFFICE.

GEORGE H. STAHL, OF QUINCY, ILLINOIS.

WATER-HEATER.

SPECIFICATION forming part of Letters Patent No. 469,101, dated February 16, 1892.

Application filed April 22, 1891. Serial No. 389,881. (No model.)

*To all whom it may concern:*

Be it known that I, GEORGE H. STAHL, of Quincy, in the county of Adams and State of Illinois, have invented certain Improvements in Water-Heaters, of which the following is a specification.

My invention relates to an improved water-heater for use in connection with incubators and in other places in which it is required to heat water rapidly by means of a lamp.

In the accompanying drawings, Figure 1 is an elevation of my heater applied to an incubator, one side of the heater being shown in vertical section through the center, as indicated by the line 1 1, Fig. 2. Fig. 2 is a top plan view, with a portion in section, on the line 2 2 of Fig. 1. Fig. 3 is a side view of devices connecting the lamp or heater proper with the water vessel or boiler.

Referring to the drawings, A represents a water vessel or boiler, preferably of a cylindrical form externally. It is constructed with an internal heating-chamber $a$, in the form of a truncated cone, extending from the base upward a considerable distance, with flues $a'$, leading thence through the top of the boiler, for the passage of the heated products. It will be observed that the walls of this chamber and of the flues present a very extended heating-surface.

B B' represent two tubes fixed firmly to the sides of the boiler and opening into its top for the passage of hot water therefrom.

C is an inclined tube opening into the lower part of the boiler for the return of the water thereto. The three tubes are fixed rigidly to the end of the incubator or other support D and serve not only as conductors for the water, but as supports for the boiler.

E represents the cylindrical body or oil-chamber of the lamp, provided at the top with an ordinary multiple burner $e$, adapted for the burning of kerosene or other oil.

F is a metallic cone having its lower end fitted snugly within the burner of the lamp and its upper end flanged and fitted closely into the heating-chamber in the base of the boiler.

G G are two lamp-sustaining rods hooked at their upper ends through ears $g$ on the sides of the boiler and provided at their lower ends with heads or enlargements $g'$, which support spiral springs $g^2$, seated within tubes $g^3$, fixed to the sides of the chamber and bearing against the upper ends of said tubes. By means of these devices the lamp is suspended from the boiler and urged upward with a spring-pressure, so that it in turn sustains the cone F firmly against the boiler. The heated air and products of combustion ascend through the cone into the heating-chamber and thence through the flues from the top of the boiler. The heated water, passing from the top of the boiler through the tubes B, passes through the tank or other circulating system and after becoming reduced in temperature returns to the base of the boiler through the tube C.

The suspension-rods G are provided with handles $g^4$ of wood or other non-conducting material, which admits of their being disconnected from the boiler and of the lamp being removed without danger to the operator.

In order to prevent undue heating of the oil within the lamp, the latter is provided around its outer edge with an upwardly-extending flange $g^5$ to retain a body of water, as shown at $g^6$.

Having thus described my invention, what I claim is—

1. The boiler having the heating-chamber in its base and the flues extending thence through its top, in combination with the top and bottom tubes B C, arranged to sustain the boiler, the cone F, applied to the base of the boiler, the lamp applied to the base of the cone, and rods G, connecting the boiler and lamp and sustaining the latter in place.

2. In combination with a boiler provided with a base-chamber and flues leading upward therefrom, means whereby the boiler is suspended without a base-support, a heating cone and lamp applied beneath said boiler, and the rods and spring applied, as shown, to suspend the lamp from the boiler, whereby the boiler is rendered available for supporting the lamp and the lamp held tightly in position thereunder.

In testimony whereof I hereunto set my hand, this 10th day of March, 1891, in the presence of two attesting witnesses.

GEORGE H. STAHL.

Witnesses:
 WILL H. MARKER,
 LOUIS H. BERGER.